Jan. 25, 1972

J. Y. WELSH 3,637,776

PROCESS FOR MAKING ANHYDROUS METAL ACETATES

Filed April 17, 1969

INVENTOR
JAY Y. WELSH,

BY Pierce, Scheffler + Parker his ATTORNEYS

Jan. 25, 1972  J. Y. WELSH  3,637,776

PROCESS FOR MAKING ANHYDROUS METAL ACETATES

Filed April 17, 1969  2 Sheets-Sheet 2

INVENTOR
JAY Y. WELSH,

BY
ATTORNEYS

United States Patent Office 3,637,776
Patented Jan. 25, 1972

3,637,776
PROCESS FOR MAKING ANHYDROUS
METAL ACETATES
Jay Y. Welsh, Catonsville, Md., assignor to Diamond
Shamrock Corporation, Cleveland, Ohio
Filed Apr. 17, 1969, Ser. No. 816,927
Int. Cl. C07f 13/00, 15/02, 15/06
U.S. Cl. 260—429                              5 Claims

ABSTRACT OF THE DISCLOSURE

Anhydrous acetate of manganese, iron, zinc, copper, cobalt or other heavy metal produced by vaporizing acetic acid from a body of substantially anhydrous liquid comprising acetic acid, condensing the vapor as a hot condensate, passing the hot condensate into and through a bed of pieces of the metal or metal oxide thereby forming some metal acetate, and returning the condensate together with dissolved acetate of the metal to said body of liquid. Because of the low level of solubility of the anhydrous metal salt the latter begins at an early stage to crystallize out of the returned solution of salt in acetic acid in the form of coarse crystals of the pure anhydrous salt. Finally, the salt crystals are separated from associated acid, and dried.

Figure 1:
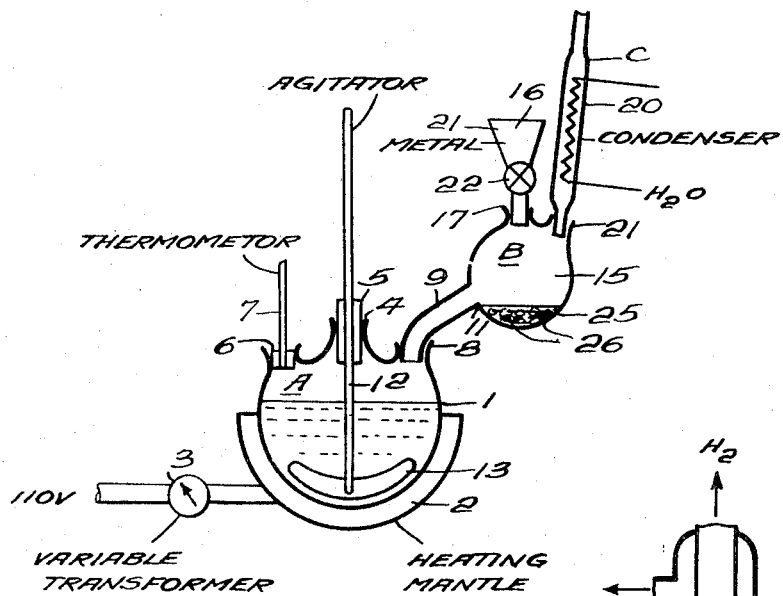

Said body of anhydrous liquid may include not only said acetic acid but also a higher-boiling acid which decomposes (upon heating) before it refluxes. In this event, the heating is effected under conditions to reflux acetic acid and to carry back to the body of liquid the acetate of the metal, whereupon a double exchange takes place in the body of liquid to obtain salt of said higher boiling acid.

---

This invention relates to the art of making metal salts of organic acids, and is concerned with improvements in the production of anhydrous organic acid salts of heavy metals. The invention has both process and apparatus aspects. While the apparatus and process are valid for the production of anhydrous organic acid salts of heavy metals in general and particularly of anhydrous acetates of manganese, iron, zinc, copper and cobalt, they will in the following be exemplified specifically with reference to the production of anhydrous manganese acetate.

Two general methods are self-evident for the preparation of anhydrous salts of organic acids, viz, (1) Reaction of the metal, metal oxide, metal carbonate, or other compound of the metal with the organic acid in aqueous medium to produce a concentrated solution followed by evaporation, crystallization of the hydrous salt, and finally the removal of the water of crystallization.

(2) The direct reaction between the metal and the organic acid, the latter being essentially in an anhydrous form.

Method #1 will not be discussed in detail, it being sufficient to point out in brief summary a number of obvious disadvantages, including the following:

(a) Several steps are involved which complicate the process.

(b) The initial crystallization must be effected from viscous solutions of high concentration, which is mechanically difficult.

(c) The dehydration of crystals containing several moles of water of crystallization produces a product with undesirable physical characteristics.

(d) Precautions must be taken in the case of manganese and iron salts to prevent chemical decomposition (i.e. hydration followed by oxidation).

Method #2 has, in the past, suffered the disadvantages of being a very slow reaction. In addition, various difficulties were encountered in handling the metal.

The present process eliminates both of these difficulties, and further produces a product of ideal physical form with a remarkable degree of stability with respect to chemical decomposition and hydration.

If manganese metal is placed in an agitated vessel containing glacial acetic acid there is an initial rapid evolution of hydrogen, but the reaction very quickly terminates. The reason the reaction so promptly ceases is that manganese acetate is only sparingly soluble in glacial acetic acid and as soon as the solution becomes saturated the surface of the metal coats with a layer of insoluble salt which coating effectively blocks further reaction. If, now, the reactants are heated, the reaction will again initiate only to slow down as soon as a new saturation limit is reached. However, when the reactants are maintained at reflux temperature and under a high degree of agitation it is in fact possible to maintain a limited rate of reaction and eventually convert all of the metal to the acetate. The product produced is coarse grained, and quite desirable in physical structure, but the following disadvantages are inherent:

(1) The reaction is undesirably slow.

(2) Under high agitation, the manganese metal is very abrasive causing erosion of the vessel along with ensuing contamination of the product.

(3) It is difficult to ascertain when all of the metal has reacted and contamination of the product with metallic manganese may result.

The process to be described hereinbelow was specifically developed to eliminate the three undesirable features just mentioned while preserving all of the advantages of the product produced.

The apparatus involves combination of three integrated equipment elements which function as a single processing unit (see FIG. 1). Element A is simply an agitated vessel equipped with heating means which contains a slurry of metal salt in substantially anhydrous acetic (or other salt-forming organic) acid. Element B is a container or combination of containers for holding pieces of the metal to be reacted, with facilities for recharging metal when it becomes depleted. In this connection it is noted that a packed column of pieces of the metal to be dissolved is inoperable in the present process because it floods with condensate and clogs with salt crystals: the contained metal pieces must be "free." Element C is a reflux condenser. Element B (the "container") is of such configuration, and of such relative disposition between elements A and C, that vapors passing from A to C pass through a zone of element B in which pieces of metal do not collect whereas condensate from C to A passes into, over and through that zone of element B in which metal pieces normally collect.

The process operates as follows:

Essentially anhydrous acetic acid is volatilized from element A and the resulting vapor passes through the empty space of element B and thence to element C where it is condensed. The condensate from element C then returns, through element B to element A. As noted above, element B is designed in such a way that the returning condensate passes over and through a contained bed of metal pieces (e.g., pieces of manganese metal). The reaction between the returning condensate and the manganese metal is continuous and rapid because the returning condensate is not saturated with manganese acetate.

It has been found in practice that the rate of reaction can be increased even more by the addition of some 1% to as much as 3% water to the acetic acid. This small amount of water still permits the formation of a completely anhydrous product and advantageously increases the solubility of manganese acetate in the solution so that the amount of manganese dissolved in each pass of condensate through the metal bed is markedly increased.

Obviously the process can be operated either continuously or batchwise without any basic change in the process equipment just described.

Subsequent steps involved in producing the final product may be mentioned but they are straight-forward and a variety of standard procedures may be employed with equally satisfactory results. When the manganese acetate slurry in element #1 has reached a practical solid density it is removed, either in entirety (batch) or in part (continuous or semi-continuous), and the solids separated by any one of several known methods. It might be mentioned here that no special effort to deliquify the product solids need be taken nor is any type of washing required or desirable. The product crystals are granular and settle or filter with the greatest facility. Any mother liquor (essentially all acetic acid) remaining in the product is readily volatilized (and reclaimed) in a subsequent drying step. The amount of soluble manganese acetate in the mother liquor is so small that the dried product cake shows no blockiness even though it initially may have contained a substantial amount of liquid phase.

Specific data of a pilot plant size of run for manganese acetate are as follows:

(a) Metal dissolution pot—2 liters capacity—maintained with 3–5 lbs. metal at all times.

(b) Reflux pot—22 liters, working volume 13 liters.

(c) Heating mantle—3,000 watts operating at 75% capacity (2250 watts) which is maximum to avoid flooding of condensers.

(d) Material balance for present system 33 lbs. manganese metal per 1 lb. product 1 lb. glacial acetic acid per 1 lb. product.

OPERATING PARAMETERS

Vapor temperature in reflux pot is maintained at 114–115° C. by judicious $H_2O$ addition. As temperature approaches 115° C. water is added periodically in 50 ml. increments at metal charging time to lower vapor temperature to 114° C.

Refluxing time per 8 hr. shift—about 6.0 hrs., considering time required for heatup—metal charging, cooling and pump-out.

Typical operation for 8 hr. day: (1-shift)

At start of shift—metal dissolution pot contains solution level at 13 liters from previous day—saturated with manganese acetate at 80° C. Solution has been maintained under mild agitation at 55° C. (Variac setting of 20) and metal pot fully charged with metallic manganese pieces. Variac setting is immediately raised to a setting of 90 which experience has shown to give maximum refluxing rate without condenser flooding. Approximately ½ hour is required to reach the refluxing temperature, and an additional ½ hour is required to saturate the reflux pot solution from the 80° C. level to the refluxing temperature level of 114–115° C. After approximately 4 hours of operation, heating is stopped momentarily to stop refluxing, and 2–3 lbs. of fresh manganese metal is charged to the metal pot and at the same time 2.5 liters of glacial acetic acid is added to the reflux pot to compensate for the volume decrease involved in crystal production. Refluxing is again started and continued for the balance of the shift until time for pump-out.

If at the time of charging the reflux temperature is nearing 115° C., 50 ml. of water is added to depress the reflux temperature to near 114° C.

The quantity of metal charge depends on visually maintaining a near constant metal level in the metal dissolution pot.

One hour before the shift ends the heat is turned off and a cold "finger" immersed in the reflux pot slurry in order to cool the slurry to near 80° C. where it can be pumped and handled safely (2). Approximately ½ hour is required for the cooling cycle.

During the cooling cycle the metal pot is again recharged in preparation for the following day's run. Cooling the slurry is required because of the type of equipment employed in this experiment. Production equipment is designed so that the pot slurry can be removed without cooling.

After the slurry (of manganese acetate crystals in acetic acid) has been cooled to 80° C. it is pumped (12–15 min. required) to a 20 liter bottle where the crystals rapidly settle to the bottom. The clear liquor is pumped back to the reflux pot and the crystals "dewetted" and this additional amount of solution also is returned to the reflux pot leaving only damp crystals in the bottle.

The volume in the reflux pot after this operation is then below the 13 liter level and is made up with fresh glacial acetic acid, the vessel closed up and the pot held under mild agitation and at 55° C. in preparation for starting the following day.

On a normal cycle of this type some 14–16 pounds of pure anhydrous coarsely crystalline product are generated.

The crystals remaining in the bottle after the pump cycle are then dried in the bottle at 125° C. overnight—then removed and packaged while still warm to avoid any water pickup during handling.

With the vapor phase temperature running 114.5° C., the percentage of water in the system is controlled at 2% and the production rate is 2.5 lbs. per hour of reflux. If 1% water were used, the production rate would be about 1.5 lbs. per hour of reflux, while if no water were employed the production rate would be only about 0.5 lb. per hour.

Should a system be employed utilizing a 22 liter reaction vessel where the metal is added directly to the acetic acid the estimated reaction rate, even with 2% $H_2O$ present, would be 0.4 lb. per hour.

In larger-scale production equipment the metal dissolution pot is designed in such a way that the metal can be charged without any change in the reflux rate.

In a manner similar to that above specifically described, anhydrous organic acid (e.g., acetic acid) salts of iron, cobalt of zinc (or other heavy metals) may be produced. Instead of acetic acid, there may be substituted other acids such, for example as propionic acid or butyric acid.

In further discussion of the process of the present invention the case of preparing anhydrous cupric acetate is described.

The process particularly described above with reference to the production of anhydrous manganese acetate is followed, except that (a) in this case the metal (Cu) is fed into the system (i.e., into the dissolution chamber in the form of copper oxide instead of metallic copper), and (b) the normally formed $H_2O$ is balanced by using, in the system, an amount of acetic acid anhydride corresponding to the amount of water formed in the salt-forming reaction. The hot condensate reacts with the CuO forming cupric acetate which is transported away from the bed of oxide and to the body of liquid in the refluxing vessel, wherein cupric acetate crystallizes out in the form of coarse, uniformly sized crystals of the anhydrous salt.

Both anhydrous zinc acetate, anhydrous cobaltous acetate and anhydrous ferrous acetate are producible by carrying out the process above described, as are anhydrous acetates of the other heavy metals as a class.

The following is a brief description of the procedure for preparing ferrous acetate by the present process.

The procedure and apparatus are identical with that for manganese acetate. However, due to the ease and rapidity with which ferrous acetate oxidizes, the following modifications are necessary:

(1) Operate under a nitrogen, or other inert atmosphere.

(2) Add a small amount of acetic anhydride to "Element A," to eliminate any traces of water.

(3) Filter, dry, and store the product in an inert atmosphere.

So conducted, the process yields a very pure, coarsely, crystalline, ferrous acetate product.

An interesting modification of the above-described process consists in a procedure for forming an anhydrous heavy metal (e.g., manganese) salt of a higher boiling acid (e.g., phthalic acid), which tends to decompose rather than to vaporize when sufficiently highly heated. According to this modification the acid content of the aforesaid "body of liquid" contained in the refluxing vessel consists in a mixture of substantially anhydrous acetic acid and the said higher boiling acid such as phthalic acid. In proceeding in accordance with this modification the vapor from the refluxing vessel consists in acetic acid as of course does the hot condensate. The latter reacts with the metal, e.g., manganese (or, the metal oxide) in the dissolution chamber forming heavy metal acetate which is carried by the condensate into the body of liquid in the refluxing vessel. The heavy metal acetate reacts with the higher boiling acid, e.g., phthalic acid, to produce the corresponding heavy metal salt, e.g., manganese phthalate.

It should be mentioned that a single element dissolution chamber may not represent the ultimate efficiency insofar as rate is concerned. That is to say, a relatively small dissolution chamber may not permit complete saturation of the returning condensate with the metal salt. Some two or more such chambers may be required to accomplish this, depending on the reflux rate and the design of the dissolution chambers. It will be apparent that longish chambers, for example, will be more effective than roundish chambers, and of course a sufficiently elongated dissolution chamber—providing space for an extensive bed of metal pieces—is the full equivalent of a series of connected, smaller, dissolution chambers.

Figure 2:
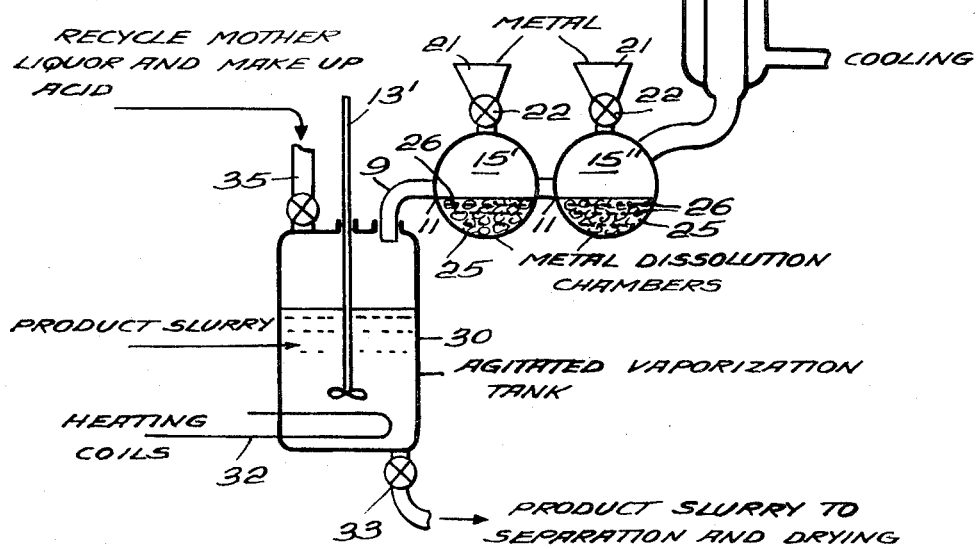
Figure 3:
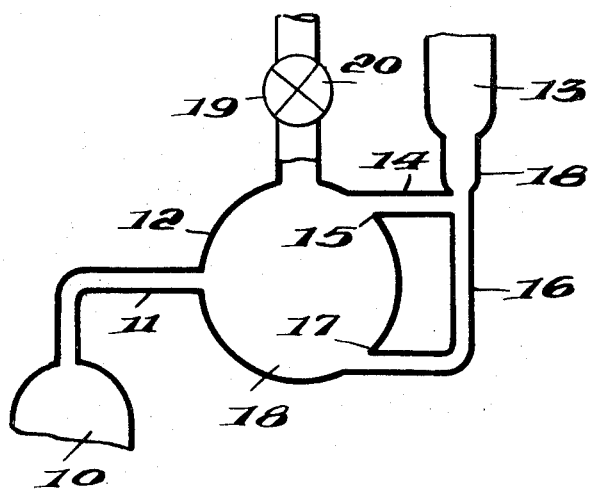

The apparatus aspect of the invention is illustrated in the appended drawing, in which FIG. 1 is a diagrammatic representation of laboratory-sized equipment adapted for batch operation, FIG. 2 diagrammatically represents a more sophisticated apparatus embodiment adapted for either batch or continuous operation, while FIG. 3 is a representation, on a larger scale, of a dissolution chamber and its associated conduits for (1) passing vapors from refluxing vessel to condenser and for (2) passing condensate through that zone of the dissolution chamber where pieces of metal will be exhaustively contacted by hot condensate.

In FIG. 1, flask 1 is a 22 liter reflux pot equipped with an electrical heating mantle 2 which, in one installation, received 110 volt current from a source not shown through variable transformers 3, the heating mantle having a heating capacity of 3000 watts. The reflux plot 1 was provided with separate vapor-tight openings including an axial opening 4 closed by a sleeve 5 and lateral openings 6 (closed by a thermometer 7) and 8 (closed by vapor-tight tube 9). Sleeve 5 provided gas-tight bearing for the shaft 12 of a conventional agitator blade 13.

Tube 9 communicated with vessel 15 about to be described in further detail, which vessel was provided with a gas-tight solids-delivering means 16 fitting opening 17 and with a condenser 20 in gas-tight communication with vessel 15 at opening 21. Solids-delivering means 16 includes a truncated hopper 21 at the apex of which is provided a star gate 22.

The tube 9 extends from vessel 15 at a point intermediate the bottom and top of the latter whereby there is provided a space 25 for a body of the bed of pieces of metal represented at 26 the surface of which bed is at no higher level than the point of departure 27 of tube 9 from vessel 15. Solids-delivering means 16 is located at substantially the top of vessel 15, so that metal pieces dropped through star gate 22 may fall on its bed 26 at roughly its mid-point. Condenser 20 is so disposed with respect to the interior of vessel 15 that condensate descending therefrom may pass into bed 26 at a point remote from the point of departure 27 of tube 9.

In use, flask 1 is supplied with a body of the organic acid, e.g. glacial acetic acid, from which the metal salt is to be produced; a bed of pieces of the metal to be reacted is established in vessel 15, the heating mantle 2 is set to use and the temperature of the vaporized acid is checked by thermometer 7 and the agitator blade 13 is caused to rotate adjacent the lower part of the flask 1. Vapor of the organic acid passes out of the flask 1 through tube 9 and through the open space of vessel 15 and into the condenser 20 wherein, through the benefit of a suitable coolant in indirect heat transfer relation the organic acid vapor is condensed to liquid form. The condensate flows downwardly out of condenser 20 into vessel 15 filling the interstices between the pieces of metal constituting bed 26. The hot condensate reacts with the metal forming some metal salt which metal salt is "washed" out of the vessel through tube 9 and into the body of boiling acid in flask 1.

As one skilled in the art will appreciate, this conduct of the reaction obviates the coating of the pieces of metal with relatively poorly soluble salt, and provides for the continuous removal of the salt as formed from the zone of reaction between acid and metal.

Continuance of the above-described operation calls for the occasional addition of fresh pieces of metal through star gate 22 to maintain a pre-determined size of bed in vessel 15.

The metal salt having but poor solubility in the organic acid largely crystallizes out in the form of exceptionally uniformly sized, relatively coarse crystals of anhydrous metal salt. When it has been determined that the procedure has been continued to a satisfactory completion point the heating is discontinued, tube 9 is withdrawn from opening 8 and thermometer 7 from opening 6, and the contents of the flask are poured out into a closed vessel. The hot acid, saturated with metal salt is decanted from the crystals of salt and returned to flask 1 together with a fresh make-up of organic acid, the parts of equipment are replaced and a second batch is started. Meanwhile, the crystals are drained and dried and packaged for further disposition.

FIG. 2 represents an apparatus generally similar to that represented in FIG. 1 but which provides for a somewhat more extensive reaction time between the pieces of metal and the hot acetic condensate. Instead of flask 1 there is provided a vaporization tank 30 equipped with agitator means 13', heating coils 32 and a valved discharge conduit 33. The vaporization tank 30 is provided adjacent its top with valved inlet pipe 35 for adding mother liquor and make-up acid.

Instead of the single dissolution vessel 15 of FIG. 1, this apparatus is provided with a plurality of similar vessels 15', 15" whereby the reaction time between acid and metal can be doubled.

As will be appreciated, the apparatus illustrated in FIG. 2 is adapted for use in continuous operation, product slurry being drawn off intermittently through valved discharge conduit 33 to a zone of separation between crystals and solution whereupon the solution can be returned, via return means not shown, to valved inlet pipe 35 together with any needed fresh make-up acid. Pieces of metal are added to vessel 15' and 15" as needed.

FIG. 3 schematically illustrates a particularly favorable disposition of vapor and condensate passageways associated with the dissolution chamber per se. In this embodiment the refluxing vessel (shown in part at 10) communicates through conduit 11 with dissolution chamber 12 at about the midpoint between its top and its bottom. Through conduit 11 there pass vapor of the acid vaporized from 10 and also condensate from a condenser 13. Chamber 12 is connected to condenser 13 by two conduits, to wit, an upper conduit 14 which leads from chamber 12 at a point 15 adjacent its top and a lower conduit 16 which enters chamber 12 at a point 17 adjacent its bottom. Conduits 14 and 16 are joined at condenser connection 18 which is located at one end of condenser 13. A charge port—for feeding metal pieces to space 18 within chamber 12—is indicated by star valve 19 in a broken-away part 20 of a conventional trapped feeder mechanism.

As an additional example of the application of the principles of the present invention, it should be noted that cobaltous acetate is produced in a manner identical to that followed in making manganese acetate, the sole difference being that the cobalt metal must be activated prior to reaction with the acid. The activated metal is obtained by reducing cobalt oxide to cobalt metal by means of hydrogen or carbon monoxide; cobalt so prepared reacts with acetic acid, whereas the regular article of commerce is substantially unreactive to acetic cid.

I claim:

1. Process of making an anhydrous organic acid salt of a heavy metal selected from the group consisting of manganese, iron, zinc, copper and cobalt, the salt being sparingly soluble in the organic acid from which it is formed which consists essentially of:

vaporizing an organic acid from a body of fluid containing such organic acid in substantially anhydrous form;

condensing the acid vapor; passing the resulting hot condensate into and through a bed of pieces of a solid containing the heavy metal from which the salt is to be formed thereby forming some organic acid salt of said heavy metal, and returning the condensate, via passage through said bed of pieces of heavy metal, to said body of fluid thereby carrying into said body condensed organic acid and associated organic acid salt of heavy metal, crystallizing said salt in said body, and separating crystallized salt from fluid components of said body.

2. The process defined in claim 1, in which the anhydrous organic acid is acetic acid.

3. Process of producing manganese acetate in substantially pure, anhydrous, coarsely crystalline form, which consists essentially of vaporizing acetic acid from a body of fluid consisting essentially of substantially anhydrous acetic acid;

leading the acetic acid vapor to a condenser and condensing the vapor therein, passing the condensed acid into and through a bed of pieces of manganese metal whereby some manganese acetate is formed, returning to said body of fluid the condensed acid and associated manganese acetate whereby said body of fluid accumulates anhydrous manganese acetate salt in substantially anhydrous acetic acid;

thereafter crystallizing out anhydrous manganese acetate in coarsely crystalline, form from said body of fluid; and separating said crystals from associated fluid.

4. Process defined in claim 3, in which the body of fluid is heated to a temperature of 114–115° C. for vaporizing acetic acid therefrom.

5. Process defined in claim 3, in which the crystallization is effected by cooling said salt-containing body of fluid to a temperature of about 80° C.

References Cited

UNITED STATES PATENTS

| | | | |
|---|---|---|---|
| 2,395,307 | 2/1946 | Weber et al. | 260—414 |
| 2,965,663 | 12/1960 | Smith et al. | 260—448 |
| 3,064,060 | 11/1962 | Battegay et al. | 260—665 |
| 3,094,546 | 7/1963 | Towers | 260—448 |

JAMES E. POER, Primary Examiner

A. P. DEMERS, Assistant Examiner

U.S. Cl. X.R.

260—429.9, 438.1, 439